B. J. NOYES.
ELECTRIC LIGHTING SYSTEM FOR AUTOMOBILES.
APPLICATION FILED APR. 9, 1913.
1,257,015. Patented Feb. 19, 1918.
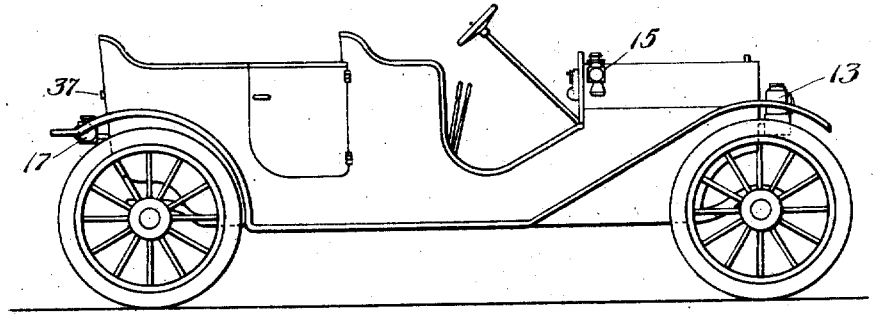
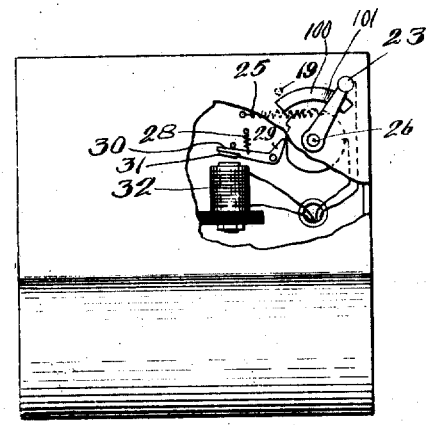
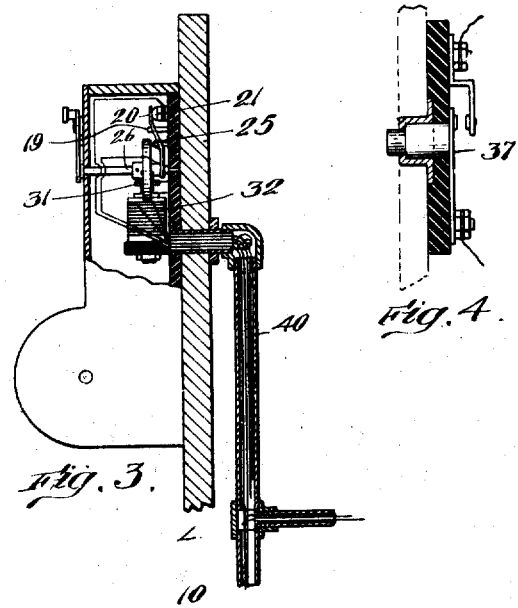
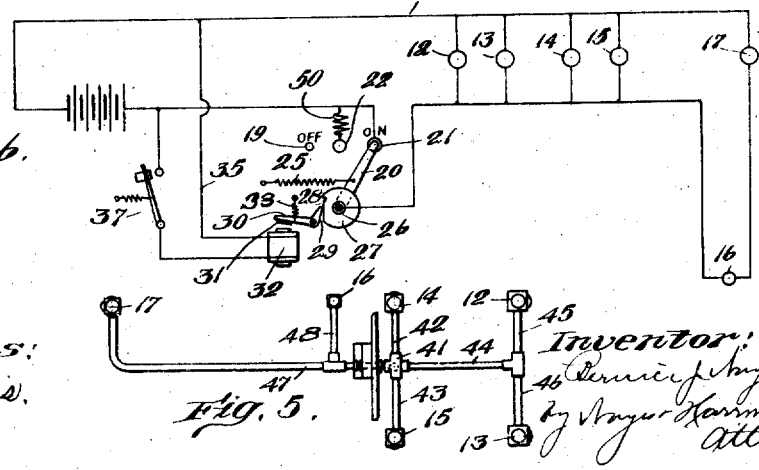
Witnesses:
H. B. Davis.
C. Doyle.

UNITED STATES PATENT OFFICE.

BERNICE J. NOYES, OF BOSTON, MASSACHUSETTS, ASSIGNOR TO SEARS B. CONDIT, JR., OF BROOKLINE, MASSACHUSETTS.

ELECTRIC-LIGHTING SYSTEM FOR AUTOMOBILES.

1,257,015.　　　　　Specification of Letters Patent.　　Patented Feb. 19, 1918.

Application filed April 9, 1913.　Serial No. 759,849.

*To all whom it may concern:*

Be it known that I, BERNICE J. NOYES, a citizen of the United States, residing at Boston, in the county of Suffolk and State of Massachusetts, have invented an Improvement in Electric-Lighting Systems for Automobiles, of which the following is a specification.

Electric lighting systems ordinarily used on automobiles are provided with a switch arranged near the driver's seat by which the lamp-circuit is closed and opened to turn on and off the lamps at will. In view of the advantage taken of this convenience by unscrupulous persons who suddenly turn off the lamps, and drive off unobserved, considerable objection is raised to the employment of such a system.

This invention has for its object the construction of controlling-means for an electric lamp-circuit of this description, which involves the employment of a switch arranged near the driver's seat adapted to be operated to turn on the lamps, and which, when thus operated is held against return movement, and means controlling the return movement of the switch to normal, which is arranged for operation at the rear or front or some other part of the automobile, remote from the driver's seat, and which necessitates the driver stopping the automobile and getting out to turn out the lamps.

The invention also has for its object the provision of means for dimming the lamps adapted to be operated by the switch, movement of the switch-member for accomplishing this result not being obstructed so that the lamps may be turned on full or dimmed at the pleasure of the driver.

Figure 1 is a side elevation of an automobile having an electric lighting-system embodying this invention.

Fig. 2 is a front view of the switch for the lamp-circuit, and controlling-device for it.

Fig. 3 is a side view and partial vertical section of the parts shown in Fig. 2.

Fig. 4 is a sectional view of the circuit-closer for the controlling-device of the lamp-circuit which is located at a remote point.

Fig. 5 is a plan view of a conduit system for the circuit-wires of the lamp-circuit by which they are concealed.

Fig. 6 is a diagram of the circuit.

10 represents an electric lamp-circuit having any desired number of lamps arranged therein in any usual or suitable manner. As here shown there are provided two head-lamps 12, 13, two side-lamps 14, 15, an indicator-lamp 16 and a tail-lamp 17.

20 represents a switch-arm which is attached to a rotatable shaft 26 having secured to it a hand-lever 23 by which it may be turned to move said switch-arm. Said switch-arm normally rests against a stop-pin 19 and is normally so held by a spring 25 which is attached to it, but when moved to close the circuit said spring is extended and subsequently acts, when permitted, to return the switch-arm. Said switch-arm is movable into engagement with a contact-member 22, which is connected through a resistance with the lamp-circuit, thus to close said circuit and include the resistance, so that the lamps are turned on yet caused to glow dimly, and said switch-arm has a further movement in the same direction whereupon it disengages said contact-member 22 and engages a contact-member 21 which is also connected with the lamp-circuit, thus to close said circuit and cause the lamps to glow brightly. Upon both movements of the switch-arm the spring 25 is extended and acts continuously to exert a force tending to return said arm to normal or open-circuit position, hence said switch-arm is normally biased to open-circuit position by the spring. On the shaft 26 of the switch-arm a disk 27 is secured having a toothed portion 28 for engagement with a detent 29 arranged on a pivoted detent-lever 30. Said detent-lever bears an armature 31 of an electro-magnet 32, but is normally held under the influence of a spring 33, thereby to hold the detent 29 in engagement with the disk. The electro-magnet 32 is included in a normally open branch of the circuit, hence is normally deënergized and said branch-circuit may be extended some distance from the switch-box or case containing the switch-arm 20, and at some remote point is provided with a circuit-closer 37, which, when operated to close the circuit will cause the electro-magnet 32 to attract its armature and thereby move the detent-lever to cause the detent to disengage the disk. When the switch-arm 20 is moved to close the lamp-circuit by engaging either contact-member 22 or 21, the detent 29 will engage the toothed portion of the disk, whereupon the disk is prevented from returning, although it may be moved at will to admit of the switch-arm engaging either contact-member and not until the circuit-closer 37 is operated can the disk be returned whereupon the switch-arm will be immediately returned to normal by the action of the spring 25. The switch-arm 20 is inclosed in a tight box or case and the shaft 26 extends through the wall thereof, and the hand-lever 23 is located on the outside of said box or case, and within easy reach of the driver who is sitting on the driver's seat, so that the switch-operating lever 23 is easily accessible, yet the switch-arm is not accessible, as will be plain from Figs. 2 and 3, of the drawings, the hand lever 23 operates over the face of the switch box, and coöperates with a front plate 100 formed with a depression or projection 101 in the surface thereof, so located that with the hand lever in coöperation with said notch, the parts will be held against the action of spring 25 to hold the switch arm on position indicated in Fig. 6 of the drawings. The notch or projection 101 is such that it will retain or lock the hand lever in the desired position, but the hand lever, by reason of its resiliency, may be disengaged from this notch and moved to engage the projection 22 of the switch, which is the dim position. The driver may thus at will position the switch in the detail or on position and temporarily hold it in such position.

The circuit-wires are arranged in a conduit-system, see Figs. 3 and 5, wherein it will be observed that a pipe or conduit 40 extends from the switch-box to a junction-box 41 from which pipes 42, 43 lead to the side lamps, and pipes 44, 45, 46 lead to the head-lamps, and pipes 47, 48 lead respectively to the tail-lamp and the indicator-lamp. By means of this conduit-system the circuit-wires are entirely inclosed, so that they cannot be tampered with, particularly by the driver while in the car.

It will, therefore, be observed that the switch for turning on the lamps is arranged in the car and is easily accessible, whereas the switch for turning off the lamps is operated by means on the outside of the car.

I claim:—

1. Controlling-means for an electric lamp-circuit of an automobile comprising a switch for said lamp-circuit, arranged near the driver's seat, the movable switch-member of which is normally biased to open position and is adapted to be moved to either of two closed positions, detent-mechanism for said switch-member, adapted to control its return movement, an electro-magnet controlling said detent-mechanism, and a circuit-closer for the circuit of said electro-magnet arranged remote from the driver's seat, substantially as described.

2. Controlling-means for an electric lamp-circuit, of an automobile comprising a case, a switch for the lamp-circuit, arranged near the driver's seat, the movable switch-member of which is arranged in said case and secured to a shaft extended through the wall of the case and having a hand-lever for turning it, a spring connected with the switch-arm for normally holding it in open circuit position, a disk secured to said shaft having a toothed portion, a detent for engaging said disk and preventing backward rotation thereof when the switch-arm is moved into closed circuit position, an electro-magnet for controlling said detent, and a remotely disposed circuit-closer for the circuit of said electro-magnet, substantially as described.

3. Controlling-means for an electric lamp-circuit of an automobile comprising a case, a switch for the lamp-circuit, arranged near the driver's seat, the movable switch-member of which is arranged in said case and secured to a shaft extended through the wall of the case and having a hand-lever for turning it, two contact-members arranged to be engaged by said switch-arm, a spring connected with the switch-arm for normally holding it in open circuit position, a disk secured to said shaft having a toothed portion, a detent for engaging said disk and preventing movement thereof to arrange the switch arm in open circuit position, an electro-magnet for controlling said detent, and a remotely disposed circuit closer for the circuit of said electro-magnet, substantially as described.

In testimony whereof, I have signed my name to this specification, in the presence of two subscribing witnesses.

BERNICE J. NOYES.

Witnesses:
H. B. DAVIS,
C. DOYLE.